(12) United States Patent
Shieh

(10) Patent No.: US 6,832,042 B1
(45) Date of Patent: Dec. 14, 2004

(54) ENCODING AND DECODING SYSTEM IN AN OPTICAL DISK STORAGE DEVICE

(75) Inventor: Jia-Horng Shieh, Junghe (TW)

(73) Assignee: Acer Laboratories Inc., Taipei (TW)

( * ) Notice: Subject to any disclaimer, the term of this patent is extended or adjusted under 35 U.S.C. 154(b) by 927 days.

(21) Appl. No.: 09/711,922

(22) Filed: Nov. 15, 2000

(30) Foreign Application Priority Data

May 24, 2000 (TW) ........................................ 89109970 A

(51) Int. Cl.[7] ........................ H04N 5/781; G06F 11/00; G11C 29/00
(52) U.S. Cl. ........................ 386/125; 386/126; 360/53; 714/746; 714/764; 714/769; 714/781
(58) Field of Search .......................... 386/45, 125, 126, 386/40, 21, 113, 116, 124; 360/32, 40, 48, 53; 714/746, 752, 756, 763, 764, 768, 769, 770, 771, 773, 781, 784, 785, 793; H04N 5/781

(56) References Cited

U.S. PATENT DOCUMENTS

| | | | | |
|---|---|---|---|---|
| 6,031,875 A | * | 2/2000 | Im | 375/262 |
| 6,041,368 A | * | 3/2000 | Nakatsuji et al. | 710/20 |
| 6,061,760 A | * | 5/2000 | Huang | 711/112 |
| 2002/0152436 A1 | * | 10/2002 | O'Dea | 714/723 |
| 2003/0077075 A1 | * | 4/2003 | Choi | 386/125 |

* cited by examiner

*Primary Examiner*—Thai Tran
(74) *Attorney, Agent, or Firm*—Michael D. Bednarek; Shaw Pittman LLP

(57) ABSTRACT

An encoding/decoding system in an optical disk storage device for performing compact disc/digital video disk (CD/DVD) encoding/decoding of data. The encoding/decoding system includes address mappers for C1, C2, CD P/Q, and DVD inner/outer codes respectively and a shareable Reel-Solomon (RS) encoder/decoder. The shareable RS encoder/decoder is capable of selectively being coupled to either one of the address mappers. When the encoding/decoding system is encoding, the shareable RS encoder/decoder employs a generation polynomial of RS code to generate a parity code of 2T symbols and output a codeword of N symbols, wherein the values of N and 2T are associated with the selected address mapper. When the encoding/decoding system is decoding, the shareable RS encoder/decoder generates a number of syndromes, $S_k$ (k=0~15 and k is a positive integer), an error-erasure locator polynomial and an error-erasure evaluator polynomial for obtaining an error value to complete the error correction, wherein a syndrome $S_k$ is set to zero if k is greater than or equal to 2T.

20 Claims, 6 Drawing Sheets

ENCODING AND DECODING SYSTEM IN AN OPTICAL DISK STORAGE DEVICE

REFERENCE TO RELATED APPLICATION

The present application claims the benefit of priority under 35 U.S.C. §119 to Taiwan Application No. 089109970 entitled "Encoding and Decoding System In An Optical Disk Storage Device," filed on May 24, 2000.

BACKGROUND OF THE INVENTION

1. Field of the Invention

The invention relates in general to encoding and decoding systems for optical disk storage devices, and more particularly to an encoding and decoding system in an optical disk storage device of a compact disk (CD) and digital video disk (DVD) dual system.

2. Description of the Related Art

An optical disk storage device of CD and DVD dual system is capable of encoding/decoding data of either CD or DVD. If it can be more effective in the hardware design of the encoding/decoding system in an optical storage device of the CD and DVD dual system, it leads to a more compact hardware design and thus the area that the hardware requires decreases. For the purpose of a more effective hardware design, the underlying theory for encoding/decoding in all optical disk storage device is first discussed.

For providing reliable and efficient encoding/decoding of the user data, it is necessary to employ error correcting codes in disk storage systems. Although there are many different error correction codes (ECC) for this purpose, Reed-Solomon (RS) codes are the most commonly used ECC in disk storage systems.

With RS codes, input data stream is processed as a sequence of symbols and all of the symbols are elements of a finite field $GF(2^w)$, where w denotes the number of bits per symbol. An RS code is a (N, K) block code, where an input data block of K message symbols is encoded, resulting in an output data block of N symbols, or called a codeword of length N. Besides, the codeword of N symbols consists of a parity code of 2T=N-K symbols.

Every symbol of the input data block of K message symbols is associated with a coefficient of a polynomial I(x). Similarly, every symbol of the 2T parity symbols is associated with a coefficient of a polynomial R(x). In addition, the N symbols of a codeword are associated with the respective coefficients of a polynomial C(x). The polynomial R(x) is defined by the expression:

$$R(x)=(I(x) \cdot x^m)MOD(G(x)),$$

where G(x) is the generator polynomial of degree m and m=2T. The G(x) is expressed as follows:

$$G(x)=\Pi_{k=0-(2T-1)}(x+\alpha^k).$$

Then, a codeword polynomial is obtained by:

$$C(x)=(I(x) \cdot x^m)+R(x).$$

The above operations is performed by an RS decoder, resulting in a codeword corresponding to the codeword polynomial C(x). On the other hand, an RS decoder receives codewords transmitted through the noisy communication channel, where the received codewords are with random erroneous symbols. For the correction of the erroneous symbols occurred in the received codewords, the RS decoder performs the decoding process including the following steps: (i) compute syndromes $S_i$; (ii) compute the coefficients of an error locator polynomial using the syndromes; (iii) compute the roots of the error locator polynomial; (iv) compute the error values by using the roots of the error locator polynomial and the syndromes.

Referring now to FIG. 1, it illustrates a conventional structure of the encoding/decoding system in CD/DVD storage devices. During the process of writing data into a disk storage medium, the input data received from a host are first stored in a data buffer 102 via the bus 101. A cyclic redundancy check (CRC) generator and correction validator 104 then reads the data stored in the data buffer 102 and generates the CRC symbols, where the input data with the CRC symbols are stored in the data buffer 102 again. The input data with the CRC symbols are read from the data buffer 102, which are randomized by a randomizer/derandomizer 106. The randomized data are then stored in the data buffer 102. For different optical storage medium, the writing operation then proceeds to different processes.

If the optical storage medium 108 is a CD, the data stored in the data buffer 102 are processed through a CD P/Q encoder/decoder 110, a C2 encoder/decoder 112, an interleaver/deinterleaver 114, and a C1 encoder/decoder 116. After that, the processed data are written into the CD. Besides, during encoding, a static random access memory (SRAM) 118 is used for storing the processing data through a bus 117.

When the optical storage medium 108 is a DVD, the data stored in the data buffer 102 are processed by using a DVD inner/outer encoder/decoder 120. After processing, the encoded data are written to the DVD. In addition, some DVDs include a burst cutting area (BCA) on the DVDs for optionally storing recording information after the completion of the writing process. If the optical storage medium 108 is a DVD with a BCA, a BCA ECC encoder/decoder 122 can be used to process the recording information. The encoded data appended with the encoded recording information are then written into the DVD.

In the process of writing data into a disk storage medium, the CD P/Q encoder/decoder 110, the C2 encoder/decoder 112, the interleaver/deinterleaver 114, the C1 encoder/decoder 116, the DVD inner/outer encoder/decoder 120, and the BCA ECC encoder/decoder 112 employ generator polynomials with respective forms. Besides, different length of symbols are involved in the encoding computation with their respective polynomials.

During the reading of the data stored in a CD/DVD, the process is run in reverse. For the sake of brevity, it will not be described.

In the conventional structure of the error correction system of the CD/DVD storage device shown in FIG. 1, there are drawbacks as follows.

(1) When the error correction system is configured for processing data in CD data format, the DVD inner/outer encoder/decoder 120, and the BCA ECC encoder/decoder 112 are idle. On the other hand, when the system is configured for processing data in DVD data format, the CD P/Q encoder/decoder 110, the C2 encoder/decoder 112, the interleaver/deinterleaver 114, and the C1 encoder/decoder 116 are idle. Thus, no matter what the configuration for processing data in CD/DVD, a part of the circuitry are idle, resulting in the employment of the system components being low in effectiveness.

(2) When the error correction system is configured for processing data in CD data format, the interleaver/ deinterleaver 114 spends additional time for access to the data buffer 102 for interleaving or deinterleaving. Thus, this increases the latency of the storage system especially in multimedia applications where large blocks of audio/video data must be read from the storage system. In this way, when the system is employed in the audio/video playback or recording applications, the quality of the playback or recording would be affected.

SUMMARY OF THE INVENTION

It is therefore an object of the invention to provide an encoding/decoding system for an optical storage device, which employs a shareable Reel-Solomon (RS) encoder/decoder. According to the invention, the hardware cost of an encoding/decoding system is lowered and the effectiveness of employment of the hardware components is increased. In addition, the invention involves the integration of interleaving/deinterleaving with C1 encoding/decoding or with C2 encoding/decoding, resulting in the lowering of the latency time.

According to the object of the invention, it provides an encoding/decoding system in an optical disk storage device, for performing compact disc/digital video disk (CD/DVD) encoding/decoding of data which is stored in a data buffer, the encoding/decoding system comprising: a C1 address mapper, a C2 address mapper, a CD P/Q address mapper, a DVD inner/outer address mapper, and a shareable Reel-Solomon (RS) encoder/decoder.

The C1 address mapper is for accessing to the data buffer according to access sequence stored in the C1 address mapper. The C2 address mapper is for accessing to the data buffer according to access sequence stored in the C2 address mapper. The CD P/Q address mapper is for accessing to the data buffer according to access sequence stored in the CD P/Q address mapper. The DVD inner/outer address mapper is for accessing to the data buffer according to access sequence stored in the DVD inner/outer address mapper. The shareable RS encoder/decoder is capable of selectively being coupled to either one of the C1 address mapper, the C2 address mapper, the CD P/Q address mapper, or the DVD inner/outer address mapper.

When the encoding/decoding system is encoding, the shareable RS encoder/decoder employs a generation polynomial of RS code to generate a first codeword of N symbols including a parity code of 2T symbols, where the values of N and 2T are associated with the selected address mapper.

When the encoding/decoding system is decoding, the shareable RS encoder/decoder generates a plurality of syndromes, $S_k$, where k=0~15 and k is a positive integer, an error-erasure locator polynomial and an error-erasure evaluator polynomial for obtaining an error value to complete the error correction. Besides, a syndrome $S_k$ is set to zero if k is greater than or equal to 2T.

For the encoding of data, the generation polynomial G(x) is:

$$G(x) = \Pi_{k=0 \sim (2T-1)}(x + \alpha^k).$$

For the decoding of data, the syndromes are obtained from:

$$S_k = \sum_{i=0 \sim N-1} (r_i \alpha^{ik}) \text{ for } k = 0 \sim 2T - 1,$$

where $r_i$ for i=0~N−1 represents the N symbols of the codeword.

For both the encoding or decoding, α is an element of a finite field $GF(2^8)$ and is a root of a primitive polynomial P(x).

$$P(x) = x^8 + x^4 + x^3 + x^2 + 1.$$

BRIEF DESCRIPTION OF THE DRAWINGS

Other objects, features, and advantages of the invention will become apparent from the following detailed description of the preferred but non-limiting embodiments. The description is made with reference to the accompanying drawings in which:

FIG. 3 (Prior Art) illustrates a DVD error correction code (ECC) block data format;

DESCRIPTION OF THE PREFERRED EMBODIMENT

Figure 2A:
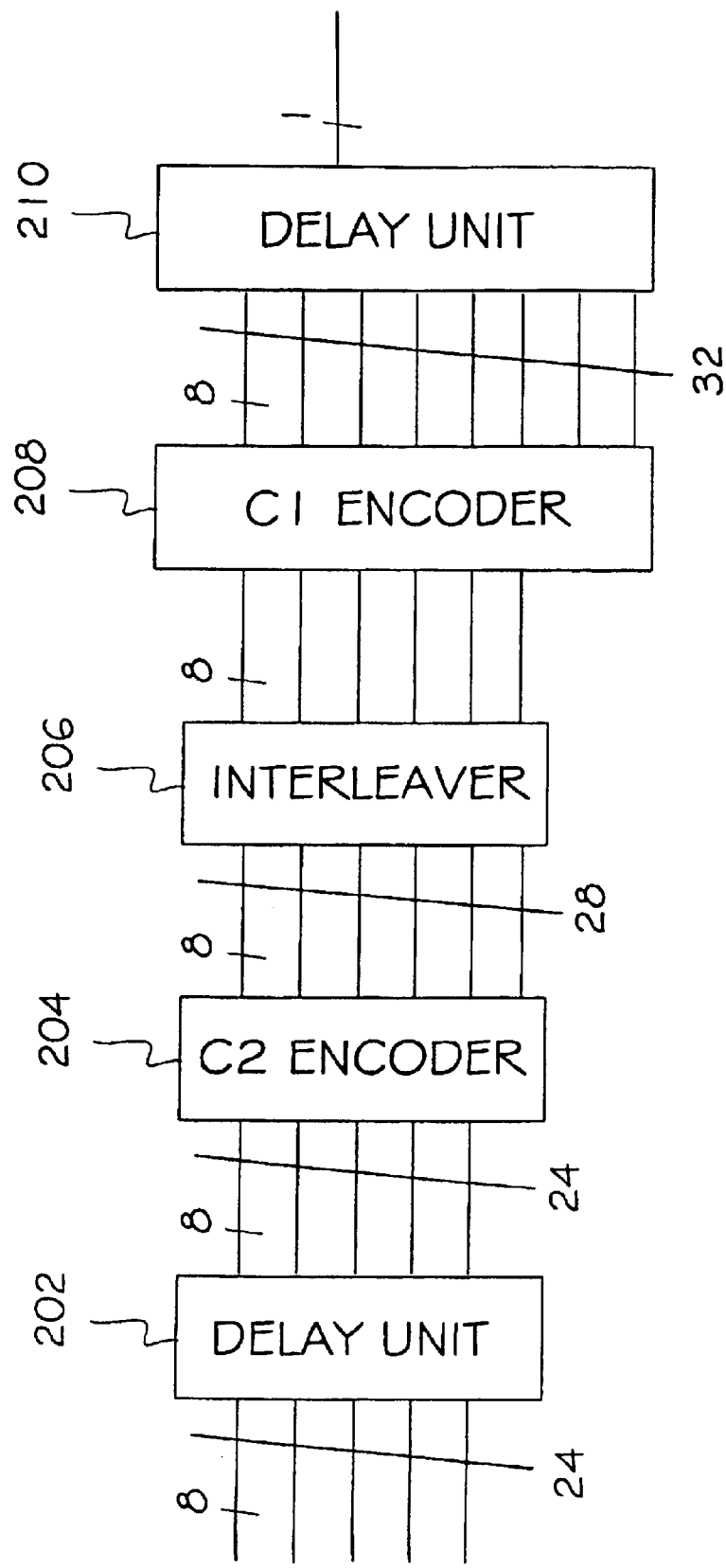
FIGS. 2A and 2B (Prior Art) is a block diagram illustrating the encoding or decoding process for cross interleave Reed-Solomon codes.
Figure 2B:
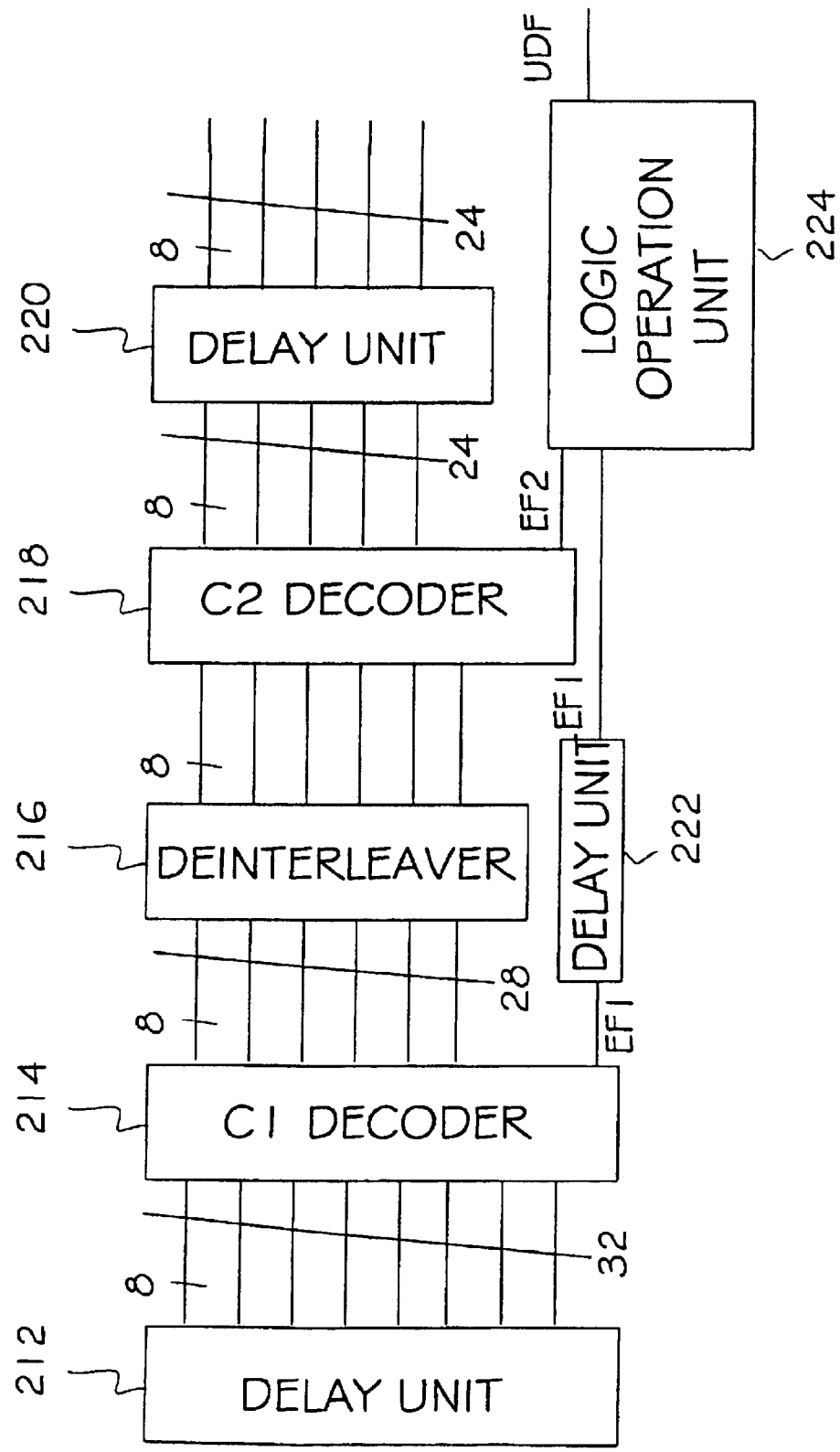

Referring to FIGS. 2A and 2B, it illustrates cross interleave Reed-Solomon code (CIRC) encoding and decoding. CIRC is commonly employed in CD technology, which includes two Reel-Solomon (RS) codes: C1 and C2 codes. In FIG. 2A, the CIRC encoding is illustrated. First, a data block of 24 message symbols is inputted into a delay unit 202. The delay unit 202 introduces delay to a portion of the data block in a delay amount of two symbols. After the introduction of delay to the data block, a C2 encoder 204 processes the delayed data block for C2 encoding, generating a parity code of 4 symbols and outputting a codeword of 28 symbols consisting of 24 message symbols and a P parity code of 4 symbols.

After that, an interleaver 206 receives the 28 symbols for interleaving, where the 28 symbols are delayed in different amount of time. The interleaved 28 symbols are then inputted into a C1 encoder 208, which generates a Q parity code of 4 symbols and resulting in a data block of 32 symbols. Finally, a delay unit 210 receives these 32 symbols and introduces a delay of one symbol to a portion of the symbols, resulting in a codeword of 32 symbols.

Referring to FIG. 2B, it illustrates the CIRC decoding with a block diagram. First, a delay unit 212 receives a 32-symbol codeword, leading to a delay of one symbol introduced to the codeword. The delayed codeword is then inputted into a C1 decoder 214. During the C1 encoding by using the C1 decoder 214, a 4-symbol Q parity code of the delayed 32-symbol codeword is used for the error correction of the 32-symbol codeword, where a 4-symbol Q parity code is capable of correcting up to two erroneous symbols of 28 symbols. In case that there are erroneous symbols more than two so that they cannot be corrected completely, the C1 decoder 214 outputs an erasure flag EF1 indicating the 28-symbol codeword containing erroneous symbols even after C1 decoding.

Next, the C1 decoded 28-symbol codeword is outputted to a deinterleaver 216, in which the deinterleaver 216 introduces delays of different number of symbols to the codeword. After that, the deinterleaved codeword are inputted into a C2 decoder 218. The C2 decoder examines the received codeword and corrects the erroneous symbols occurring in the 24 symbols of the codeword for C2 decoding by using its P parity code of 4 symbols. The P parity code of 4 symbols is capable of correcting up to four erroneous symbols occurred in the 28 symbols. In case that there are erroneous symbols more than four so that they cannot be corrected completely, the C2 decoder 218 outputs an erasure flag EF2 indicating the 24-symbol codeword containing erroneous symbols even after C2 decoding. The C2 decoded 24-symbol codeword is then inputted into a delay unit 220. The delay unit 220 introduces a delay of two symbols to a portion of the symbols of the codeword, resulting in the codeword of 24 symbols. During the decoding process, the erasure flag EF1 after processing by a delay unit 222 and the erasure flag EF2 are applied to a logic operation unit 224, resulting in an unreliable data flag (UDF) for indicating that the 28-symbol codeword containing erroneous symbols even after the decoding process.

During C1 decoding, the C1 decoder 214 receives a 32-symbol codeword which contains a parity code of 4 symbols. On the other hand, during C1 encoding, the C1 encoder 208 receives a 28-symbol codeword and generates a parity code of 4 symbols. Thus, the codeword length of the codewords processed by the C1 encoder/decoder can be defined as 32 symbols, where each symbol is of 8 bits. In this way, the generator polynomial employed in the C1 encoder/decoder is defined by:

$$G_{C1}(x)=\Pi_{k=0-3}(x+\alpha^k).$$

During C2 decoding, the C2 decoder 218 receives a 28-symbol codeword which contains a parity code of 4 symbols. On the other hand, during C2 encoding, the C2 encoder 204 receives a 24-symbol codeword and generates a parity code of 4 symbols. Thus, the codeword length of the codewords processed by the C2 encoder/decoder can be defined as 28 symbols, where each symbol is of 8 bits. In this way, the generator polynomial employed in the C2 encoder/decoder is defined by:

$$G_{C2}(x)=\Pi_{k=0-3}(x+\alpha^k).$$

On the other hand, the codeword length of the codewords processed by the P code encoder/decoder in the conventional CD P/Q encoder/decoder 110 is 26 symbols. In this way, the generator polynomial is defined by:

$$G_P(x)=\Pi_{k=0-1}(x+\alpha^k).$$

Besides, the codeword length of the codewords processed by the Q code encoder/decoder in the conventional CD P/Q encoder/decoder 110 is 45 symbols. In this way, the generator polynomial is defined by:

$$G_Q(x)=\Pi_{k=0-1}(x+\alpha^k).$$

Figure 3:
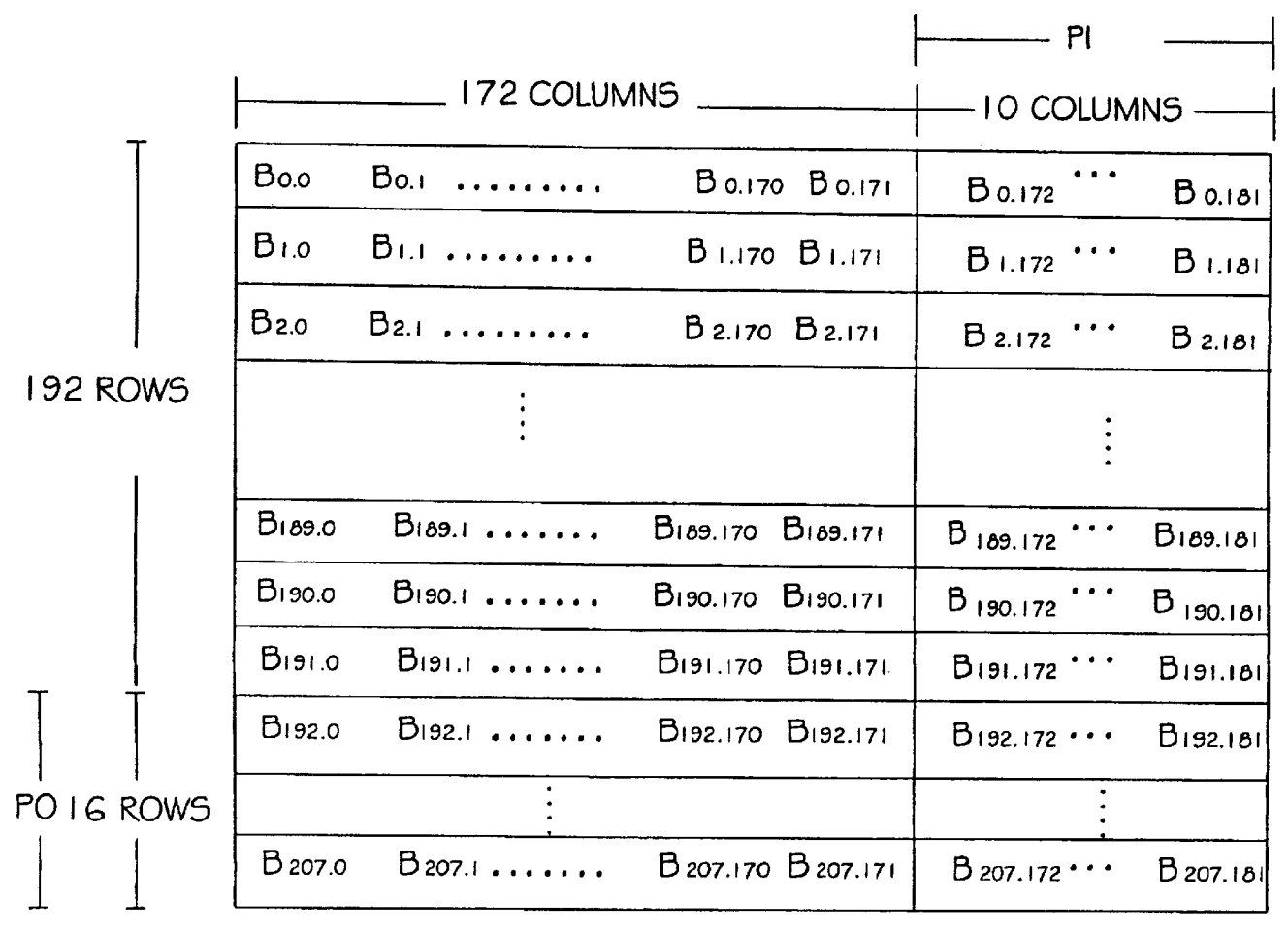

Referring now to FIG. 3, it illustrates a DVD ECC block data format. In DVD data format, two-dimensional product code is utilized in order to enhance the tolerance of error. As can be seen from FIG. 3, a ECC block contains 192 row×172 column data elements, such as the data elements denoted $B_{0,0} \sim B_{191,171}$. Next, 16 rows of outer-code parity (PO) are generated in the row direction by using the 192 row×172 column data, such as the data elements denoted $B_{192,0} \sim B_{207,171}$ as shown in FIG. 3. After that, 192 row×172 column data elements with the 16 rows of PO are used in the generation of 10 columns of inner-code parity (PI), such as elements denoted $B_{0,172} \sim B_{207,181}$ as shown in FIG. 3.

In terms of the elements of the j-th column of PO, namely $B_{i,j\ (i=192-207)}$, a polynomial $R1_j(x)$ is obtained as:

$$R1_j(x) = \sum_{i=192-207} (B_{i,j} \cdot x^{207-i})$$

where the element of the j-th column of PO, namely $B_{i,j\ (i=192-207)}$, can be obtained from the following equations:

$$R1_j(x)=(I1_j(x)\cdot x^{16})MOD(G_{PO}(x)),$$

$$I1_j(x) = \sum_{i=0-191} (B_{i,j} \cdot x^{191-i}),$$

and $$G_{PO}(x)=\Pi_{k=0-15}(x+\alpha^k).$$

Similarly, in terms of the elements of the i-th row of PI, namely $B_{i,j\ (j=172-181)}$, a polynomial $R2_i(x)$ is obtained as:

$$R2_i(x) = \sum_{j=172-181} (B_{i,j} \cdot x^{181-j}),$$

where the element of the i-th row of PI, namely $B_{i,j\ (i=172-181)}$, can be obtained from the following equations:

$$R2_i(x)=(I2_i(x)\cdot x^{16})MOD(G_{PI}(x)),$$

$$I2_i(x) = \sum_{j=0-171} (B_{i,j} \cdot x^{191-j}),$$

and $$G_{PI}(x)=\Pi_{k=0-9}(x+\alpha^k).$$

If the encoding/decoding system employs the burst cutting area (BCA) code for describing the recording information after the process of writing data into the DVD, the encoding/decoding system further includes a BCA ECC encoder/decoder. During BCA ECC encoding/decoding, the BCA ECC encoder/decoder processes codewords of 16 symbols and utilizes the generator polynomial in the process as follows:

$$G_{BCA}(x)=\Pi_{k=0-3}(x+\alpha^k),$$

where α is an element of a finite field $GF(2^8)$ and is a primitive root of the primitive polynomial:

$$P(x)=x^8+x^4+x^3+x^2+1.$$

The following is a summary of the discussion above about the generator polynomials in each encoding/decoding process.

(1) C1 encoder/decoder involves processing codewords of 32 symbols and utilizes the generator polynomial $G_{C1}(x)$ in the process as follows:

$$G_{C1}(x)=\Pi_{k=0-3}(x+\alpha^k),$$

(2) C2 encoder/decoder involves processing codewords of 28 symbols and utilizes the generator polynomial $G_{C2}(x)$ in the process as follows:

$$G_{C2}(x)=\Pi_{k=0-3}(x+\alpha^k).$$

(3) CD P encoder/decoder involves processing codewords of 26 symbols and utilizes the generator polynomial $G_P(x)$ in the process as follows:

$G_P(x)=\Pi_{k=0-1}(x+\alpha^k).$ (4) CD Q encoder/decoder involves processing codewords of 45 symbols and utilizes the generator polynomial $G_Q(x)$ in the process as follows:

$G_Q(x)=\Pi_{k=0-1}(x+\alpha^k).$ (5) DVD outer encoder/decoder involves processing codewords of 208 symbols and utilizes the generator polynomial $G_{PO}(x)$ in the process as follows:

$G_{PO}(x)=\Pi_{k=0-15}(x+\alpha^k).$ (6) DVD inner encoder/decoder involves processing codewords of 182 symbols and utilizes the generator polynomial $G_{PI}(x)$ in the process as follows:

$G_{PI}(x)=\Pi_{k=0-9}(x+\alpha^k).$ (7) BCA ECC encoder/decoder involves processing codewords of 16 symbols and utilizes the generator polynomial $G_{BCA}(x)$ in the process as follows:

$G_{BCA}(x)=\Pi_{k=0-3}(x+\alpha^k).$

Therefore, the C1 encoder/decoder, C2 encoder/decoder, CD P encoder/decoder, CD Q encoder/decoder, DVD outer encoder/decoder, DVD inner encoder/decoder, and BCA ECC encoder/decoder process codewords of different codeword lengths and their respective generator polynomials can be expressed as a general generator polynomial:

$G(x)=\Pi_{k=0-(2T-1)}(x+\alpha^k).$     (*)

When the general generator polynomial is utilized in the C1 encoder/decoder, the C2 encoder/decoder, or the BCA ECC encoder/decoder, T=2. When it is utilized in CD P/Q code encoder/decoder, T=1. When it is utilized in DVD outer encoder/decoder or DVD inner encoder/decoder, T=8 or 5 respectively.

In addition, $\alpha$ is an element of a finite field $GF(2^8)$ and is a primitive root of the primitive polynomial:

$P(x)=x^8+x^4+x^3+x^2+1.$

When the encoding/decoding system is configured for processing data in CD data format, the $\alpha$ in the respective generator polynomial employed by the C1 encoder/decoder, C2 encoder/decoder, or CD P/Q encoder/decoder is an element of the finite field $GF(2^8)$. When the encoding/decoding system is configured for processing data in DVD data format, the $\alpha$ in the respective generator polynomial employed by the DVD inner/outer encoder/decoder and BCA ECC encoder/decoder is also an element of the finite field $GF(2^8)$. Thus, when the encoding/decoding system is switched from CD mode to DVD mode or from DVD mode to CD mode, it is no need to do any field conversion of the RS codes.

In this way, the RS encoders/decoders discussed above can be integrated into one RS encoder/decoder. For performing different encoding or decoding processes, the codeword length and the value of T are changed to the corresponding values in the integrated RS encoder/decoder. Besides, different values of T relate to the number of syndromes computed during respective decoding processes.

Figure 1:
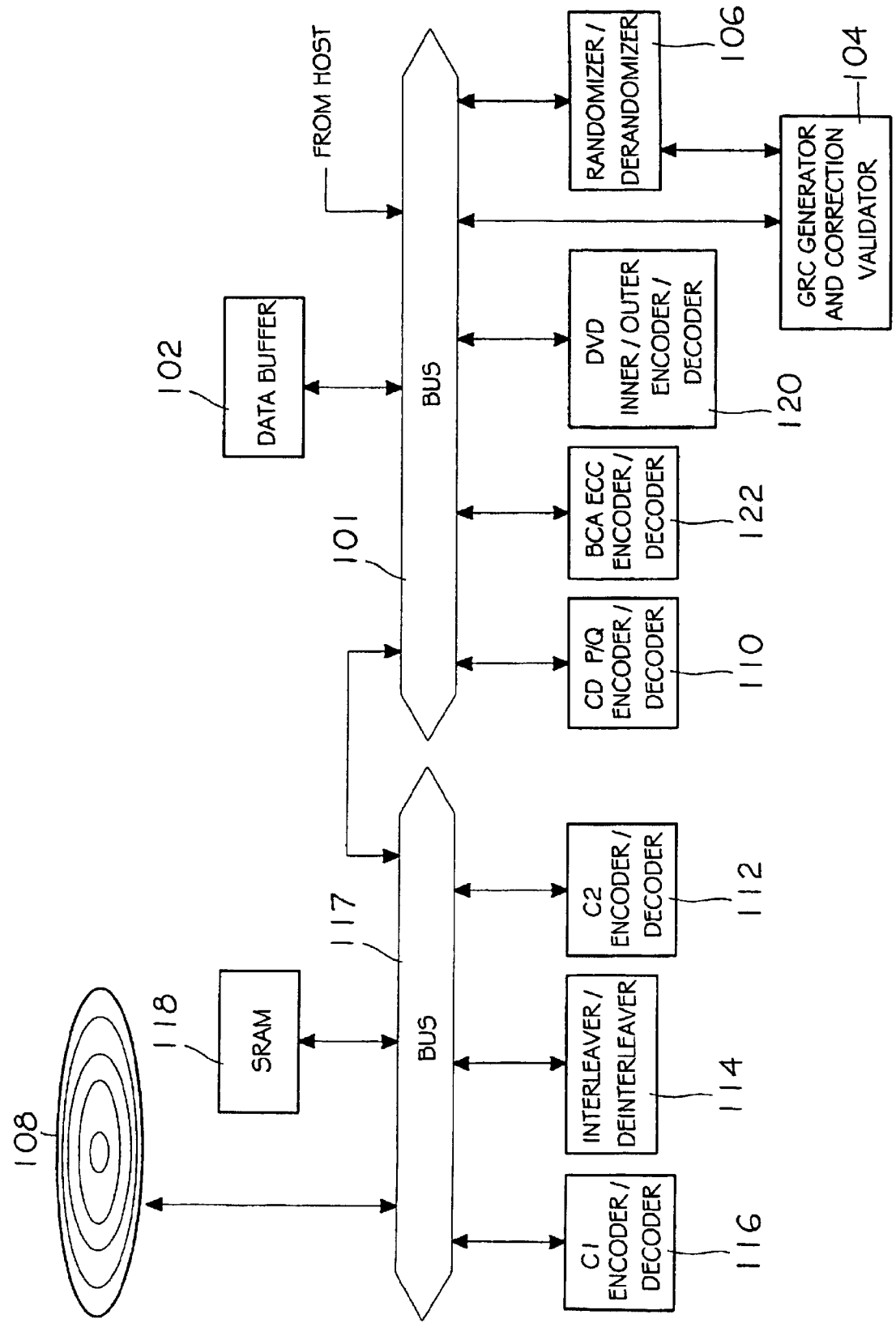
FIG. 1 (Prior Art) illustrates a conventional encoding/decoding system in a CD/DVD storage device.

In the dual CD/DVD encoding/decoding system as shown in FIG. 1, the length of codewords and the sequence of access to the data buffer 102 are different for each of the RS encoder/decoder. For one RS encoder/decoder, the sequence of access to the data buffer 102 can be stored in an address mapper. For instance, a mapper table specifying the access sequence can be utilized in the address mapper. On the other hand, since the generator polynomial employed in each RS encoder/decoder in FIG. 1 is an instance of the general generator polynomial, the encoding/decoding processes can be performed by one shareable RS encoder/decoder with the value of 2T variably corresponding to different encoding/decoding process. In this way, a specific RS encoder/decoder shown in FIG. 1 can be replaced by a combination of an address mapper and a shareable RS encoder/decoder.

Figure 4:
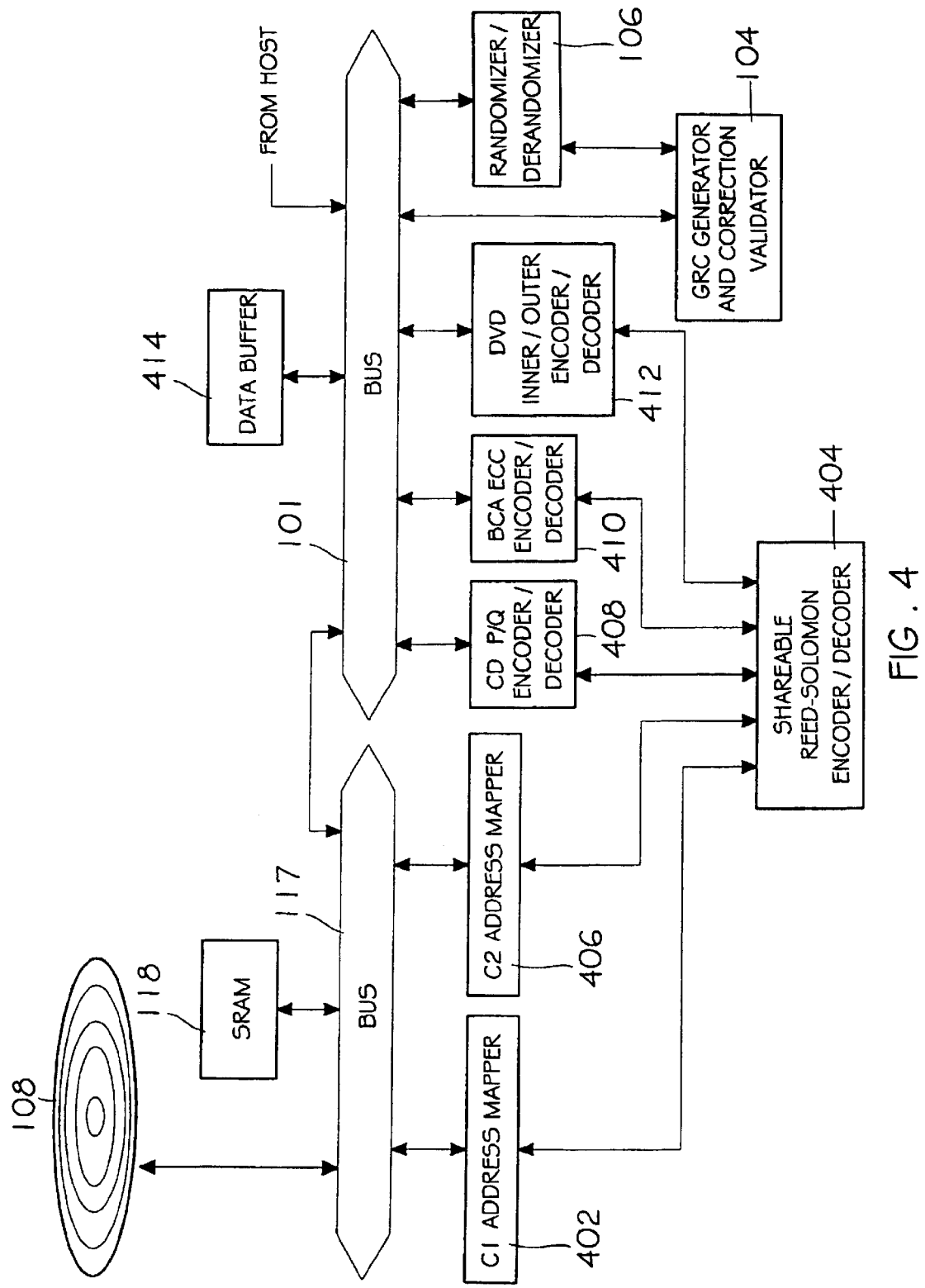
FIG. 4 illustrates an encoding/decoding system in an optical storage device according to a preferred embodiment of the invention.

Referring now to FIG. 4, it illustrates an encoder/decoder in an optical disk storage device according to the preferred embodiment of the invention. In FIG. 4, a C1 address mapper 402 and a shareable RS encoder/decoder 404 replace the C1 encoder/decoder 116 in FIG. 1. A C2 address mapper 406 and the shareable RS encoder/decoder 404 replace the C2 encoder/decoder 112 in FIG. 1. A CD P/Q address mapper 408 and the shareable RS encoder/decoder 404 replace the C2 encoder/decoder 110 in FIG. 1. A BCA ECC address mapper 410 and the shareable RS encoder/decoder 404 replace the BCA ECC encoder/decoder 122 in FIG. 1. Finally, a DVD outer/inner address mapper 412 and the shareable RS encoder/decoder 404 replace the DVD outer/inner encoder/decoder 120 in FIG. 1.

In addition, the address mappers mentioned above are responsible for accessing to the corresponding data buffer according to the sequence of access stored in the address mappers. To be more specific, they are described as follows. The C1 address mapper 402 accesses to the data buffer 414 according to the access sequence stored in the C1 address mapper 402. The C2 address mapper 406 accesses to the data buffer 414 according to the access sequence stored in the C2 address mapper 406. The CD P/Q address mapper 408 accesses to the data buffer 414 according to the access sequence stored in the CD P/Q address mapper 408. The BCA ECC address mapper 410 accesses to the data buffer 414 according to the access sequence stored in the BCA ECC address mapper 410. At last, the DVD inner/outer address mapper 412 accesses to the data buffer 414 according to the access sequence stored in the DVD inner/outer address mapper 412.

Additionally, the shareable RS encoder/decoder 404 is capable of selectively being coupled to either one of the C1 address mapper 402, the C2 address mapper 406, the CD P/Q address mapper 408, the BCA ECC address mapper 410, or the DVD inner/outer address mapper 412.

When the encoding/decoding system in FIG. 4 is encoding data, the shareable RS encoder/decoder 404 employs the generator polynomial of RS code to generate a parity code of 2T symbols, resulting in an output of a codeword of N symbols, where the values of 2T and N relate to the selected address mapper that connects to the shareable RS encoder/decoder 404. When the encoding/decoding system in FIG. 4 is decoding data, in order to correct the erroneous data, the shareable RS encoder/decoder 404 generates a number of syndromes $S_k$, where k=0~15 and k is a positive integer, an error-erasure locator polynomial, and an error-erasure evaluator polynomial, for obtaining an error value. Besides, the syndrome $S_k$ takes the value of zero if k is not smaller than 2T.

Moreover, since the operations of the interleaver/deinterleaver 114 can be viewed as a specific sequence of access to memory, the operations of interleaving/deinterleaving can also be performed by an address mapper. In FIG. 4, the address mapper for interleaving/deinterleaving can be combined into the C1 address mapper 402 or the C2 address mapper 406. In this way, the operations of interleaving/deinterleaving can be done during the C1 address mapper 402 or the C2 address mapper 406 accesses to the data buffer 414. Thus, the times of access to the data buffer 414 is reduced and the latency of the CIRC encoding/decoding process is lowered as well.

In FIG. 4, the encoding/decoding system utilizes the buses 101 and 107, the cyclic redundancy check (CRC) generator, the correction validator 104, the randomizer/derandomizer 106, the optical storage medium 108, and the static random access memory (SRAM) 118 as the conventional system shown in FIG. 1. Thus, the corresponding operations of them are not described for the sake of brevity.

Figure 5:
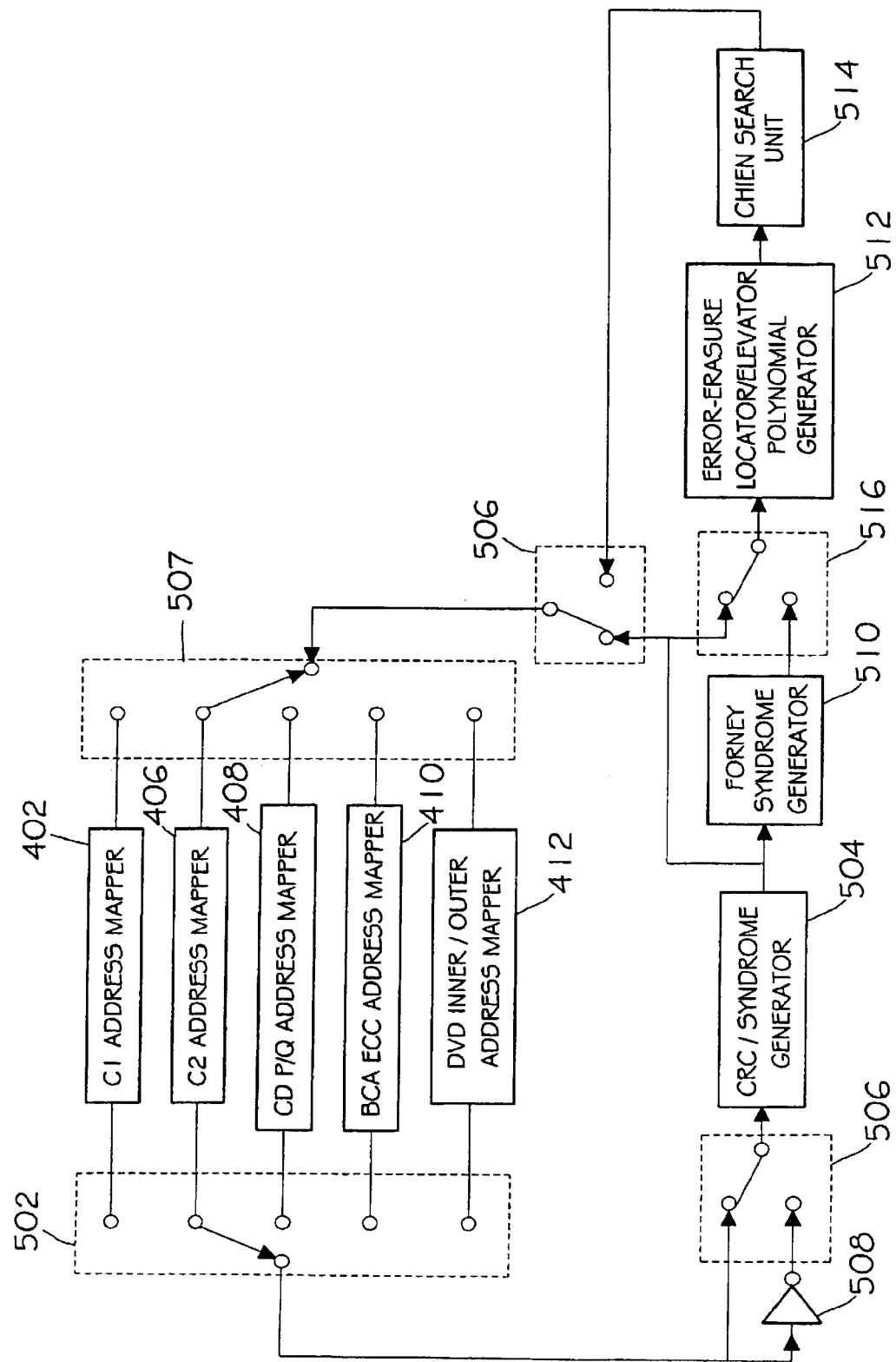
FIG. 5 is a detailed block diagram of the RS encoder/decoder in FIG. 4.

Referring to FIG. 5, it illustrates the structure of the shareable RS encoder/decoder in FIG. 4. In FIG. 5, using a switch 502, either one of the outputs of the C1 address mapper 402, the C2 address mapper 406, the CD P/Q address mapper 408, the BCA ECC address mapper 410, or the DVD inner/outer address mapper 412 is selected as the input of the shareable RS encoder/decoder 404. When the shareable RS encoder/decoder 404 is encoding data, the received data are transferred to an ECC/syndrome generator 504. The ECC/syndrome generator 504 employs the generator polynomial to generate parity codes and outputs codewords including parity codes.

The shareable RS encoder/decoder 404 further includes a switch 506 and an inverter 508 for selecting either delivering data to the ECC/syndrome generator 504 directly or inverting the data before delivering the inverted data to the ECC/syndrome generator 504.

When the encoding/decoding system in FIG. 4 is encoding data, through the switches 506 and 507, the codewords generated by the ECC/syndrome generator 504 are delivered to either one of the C1 address mapper 402, the C2 address mapper 406, the CD P/Q address mapper 408, the BCA ECC address mapper 410, or the DVD inner/outer address mapper 412. It is noted that the switches 502 and 507 are used for selecting an identical address mapper. In addition, the generator polynomial and the length of codeword processed in the ECC/syndrome generator 504 correspond to the selected address mapper.

In other words, the ECC/syndrome generator 504 employs the generator polynomial as follows:

$$G(x)=\Pi_{k=0 \sim (2T-1)}(x+\alpha^k). \quad (*)$$

When the ECC/syndrome generator 504 processes the data delivered by the C1 address mapper 402, the C2 address mapper 406, or the BCA ECC address mapper, T is set to two. When the ECC/syndrome generator 504 processes the data delivered by the CD P/Q address mapper 408, T is set to one. When the ECC/syndrome generator 504 processes the data delivered by the DVD inner/outer address mapper 412, T is set to five for DVD inner encoding/decoding or set to eight for DVD outer encoding/decoding respectively.

When decoding data, the shareable RS encoder/decoder has two approaches to the processing of the received data. One approach is to deliver the received data to the ECC/syndrome generator 504. Next, the processing employs a Forney syndrome generator 510, an error-erasure locator/evaluator polynomial generator 512, and a Chien search unit 514 and then results in the required output. Another approach is to deliver the received data to the ECC/syndrome generator 504. After that, the processing employs an error-erasure locator/evaluator polynomial generator 512 and a Chien search unit 514 to obtain the required data. In the processing of the received data, the shareable RS encoder/decoder uses the switch 516 to select either one of the two approaches.

The decoding process that the shareable RS encoder/decoder performs includes the steps as follows, where each codeword is of length of N symbols including a parity code of 2T symbols and the values of N and 2T relate to the selected address mapper.

(a) Compute the set of 2T syndromes $S_0, S_1, \ldots, S_i, \ldots$ and $S_{2T-1}$ corresponding to the 2T roots of the generator polynomial after receiving a codeword. The 2T syndromes are expressed as:

$$S_k = \sum_{i=0 \sim N-1}(r_i x^i)\bigg|x=\alpha^k = \sum_{i=0 \sim N-1}(r_i \alpha^{ik}) \text{ for } k=0 \sim 2T-1,$$

where $r_{i(i=0 \sim N-1)}$ represents the N symbols in the codeword. The syndrome polynomial S(x) is as follows:

$$S(x) = \sum_{i=0 \sim 2T-1}(S_i x^i).$$

(b) Compute the erasure location polynomial Λ(x):

$$\Lambda(x)=\Pi_{k=0 \sim e}(x+\alpha^{jk})$$

according to the e known erased locations and compute Forney's modified syndrome polynomial T(x):

$$T(x)=S(x)\Lambda(x) \bmod(x^{2T}) \quad (**)$$

The polynomial T(x) is used for obtaining the initialization values for performing the following step (c).

(c) Obtain the error-erasure locator polynomial σ(x) and the error-erasure evaluator polynomial ω(x) by using the Euclidean algorithm.

When deg(Λ(x))>deg(T(x)), it indicates that there is no any erroneous symbol and so it does not require to perform the Euclidean algorithm.

At the beginning of performing the Euclidean algorithm, four polynomials, namely $\mu_i(x)$, $\lambda_i(x)$, $R_i(x)$, and $Q_i(x)$, are introduced to the computation and the corresponding initialization polynomials are defined as:

$$\mu_0(x)=\Lambda(x) \; R_0(x)=x^{2T}$$

$$\lambda_0(x)=0 \; Q_0(x)=Tx)$$

Next, utilize the following recursive equations to compute the polynomials $\mu_i(x)$, $\lambda_i(x)$, $R_i(x)$, and $Q_i(x)$. At the beginning, i is assigned as one and i increases by one after computation of the recursive equations for one time.

$$R_i(x)=\{\sigma_{i-1}b_{i-1}R_i-1(x)+\overline{\sigma}_i-1a_{i-1}Q_i-1(x)\}-X^{|l_{i-1}|}\{\overline{\sigma}_{i-1}b_i-1R_i-1(x)+\sigma_i-1a_i-1Q_{i-1}(x)\}$$

$$\lambda_i(x)=\{\sigma_{i-1}b_{i-1}\lambda_{i-1}(x)+\overline{\sigma}i-1a_i-1\mu_{i-1}(x)\}-X^{|l_{i-1}|}\{\overline{\sigma}i-1\lambda_{i-1}(x)+\sigma_{i-1}a_{i-1}\mu_{i-1}(x)\{$$

$$Q_i(x)=\sigma_{i-1}Q_{i-1}(x)+\overline{\sigma}_{i-1}R_{i-1}(x)\}$$

$$\mu_i(x)=\sigma_{i-1}\mu_{i-1}(x)+\overline{\sigma}i-1\lambda_{i-1}(x)\}$$

$$Q_i(x)=\sigma_{i-1}Q_{i-1}(x)+\overline{\sigma}_{i-1}R_{i-1}(x)\}$$

$$\mu_i(x)=\sigma_{i-1}\mu_{i-1}(x)+\overline{\sigma}_{i-1}\lambda_{i-1}(x)\}$$

In the above recursive equations, $a_{i-1}$ and $b_{i-1}$ are the coefficients of the maximal exponents of $R_i(x)$ and $Q_i(x)$ respectively.

In addition, $l_{i-1}=\deg(R_{i-1}(x))-\deg(Q_{i-1}(x))$ and when $l_{i-1}<0$, $\sigma_{i-1}=0$; otherwise $\sigma_{i-1}=1$.

When $\deg(\lambda_f(x)) > \deg(R_f(x))$, set the error-erasure locator polynomial $\sigma(x) = \lambda_f(x)$ and the error-erasure evaluator polynomial $\omega(x) = R_f(x)$.

(d) Find the roots of the error-erasure locator polynomial U(x) by the Chien search technique. When an error location is found, the error value corresponding to the error location can be computed.

(f) Finally, the error correction is completed by adding the error value to the codeword for replacing the erroneous symbol according to the error location found with the corresponding error value.

In the above decoding process, et is an element of a finite field $GF(2^8)$ and is a root of the primitive polynomial:

$$P(x) = x^8 + x^4 + x^3 + x^2 + x^1.$$

In addition, the ECC/syndrome generator 504 is for performing step (a), outputting the syndrome values $S_0, S_1, \ldots, S_{15}$, where some of the syndromes are set to zero. The Forney syndrome generator 510 is for performing step (b), generating the erasure location polynomial and the Forney's modified syndrome polynomial. The error-erasure locator/evaluator polynomial generator 512 is for performing step (c), generating the error-erasure locator polynomial and error-erasure evaluator polynomial by using the initialization values obtained from step (b). The Chien search unit 514 is for performing steps (d) and (f), obtaining the roots of the error-erasure locator polynomial and error values and completing the error correction by replacing the erroneous symbols with the error values.

When computing the syndromes from the expression (*), the number of the required syndromes is 2T, where the maximum of 2T is 16. The situation of computing 16 syndromes occurs when performing DVD outer decoding. In this way, the ECC/syndrome generator 504 is set to be able to generate 16 syndromes: $S_0, S_1, \ldots, S_{15}$. In a situation that the decoding process requires computing syndromes of a number being smaller than 16, syndromes $S_k$ where k is larger than 2T are set to zero in the set of syndromes $S_k$ (k=0~15). For instance, the C1 decoding process only requires computing the syndromes $S_0$ to $S_3$, so the syndromes $S_4$ to $S_{15}$ are all set to zero.

When the decoding process illustrated in FIG. 2B produces an erasure flag, it indicates that there is an erasure. The difference between an erasure and an error is: the location and the value of the error are unknown while the location of the erasure is known but the value of the erasure is unknown.

In this way, when there is an erasure, the Forney syndrome generator 510 is utilized to obtain the erasure locator polynomial for generating the initialization values. The initialization values are then inputted into the error-erasure locator/evaluator polynomial generator 512. When there is no erasure, the Forney syndrome generator 510 is not used. Thus, when the ECC/syndrome generator 504 completes the computation of syndromes, the syndromes are delivered to the error-erasure locator/evaluator polynomial generator 512 through the switch 516. In this situation, the Forney's syndrome generator 510 is avoided by using the use of the switch 516, reducing the time spending on the computation in the Forney syndrome generator 510. Thus, it results in lowering the latency.

It should be noted that for computing the error-erasure locator polynomial and the error-erasure evaluator polynomial, algorithms other than the Euclidean algorithm can be used as well, such as the Berlekamp algorithm (a well-known algorithm used in the decoding in this art, not described for the sake of brevity). In addition, for increasing the rate of encoding/decoding, two or more shareable RS encoder/decoder can be used.

To sum up, (1) when the value of 2T is changed, for a set of syndromes $S_k$ where k=0~15, a syndrome $S_k$ in the set of syndromes is set to zero when k>2T; (2) the computation result of the Forney's modified syndrome polynomial, $T(x) = S(x)\Lambda(x) \mod (x^{2T})$, relates to the value of 2T; and (3) for obtaining the error-erasure locator polynomial and the error-erasure evaluator polynomial by using the Euclidean algorithm, the initialization values relates to the value of 2T.

As for the situation that the Berlekamp algorithm is adopted instead of the Euclidean algorithm for obtaining the error-erasure locator polynomial and the error-erasure evaluator polynomial, the times of recursive operation relates to the values of 2T as well as the initialization values.

On the other hand, when the length of the codewords are changed, the value of N in the computation of syndromes $$S_k = \sum_{i=0 \sim N-1} (r_i x^i)$$

changes as well. In addition, the Chien search technique requires an adjustment as the codeword length is changed.

It is disclosed above that the encoding/decoding system of the optical storage device utilizes only a shareable RS encoder/decoder, resulting in the reduction of hardware cost and the enhancement of the effectiveness of the hardware usage. In addition, according to the invention, the interleaving/deinterleaving is combined into the process of C1 encoding/decoding or C2 encoding/decoding, resulting in the lowering of the latency of the encoding/decoding system.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An encoding/decoding system in an optical disk storage device, for performing compact disc/digital video disk (CD/DVD) encoding/decoding of data, the data stored in a data buffer, the encoding/decoding system comprising:

a C1 address mapper for accessing to the data buffer according to access sequence stored in the C1 address mapper;

a C2 address mapper for accessing to the data buffer according to access sequence stored in the C2 address mapper;

a CD P/Q address mapper for accessing to the data buffer according to access sequence stored in the CD P/Q address mapper;

a DVD inner/outer address mapper for accessing to the data buffer according to access sequence stored in the DVD inner/outer address mapper; and a shareable Reel-Solomon (RS) encoder/decoder capable of selectively being coupled to either one of the C1 address mapper, the C2 address mapper, the CD P/Q address mapper, or the DVD inner/outer address mapper;

wherein the shareable Reel-Solomon (RS) encoder/decoder employs a generation polynomial of RS code when the encoding/decoding system is encoding, the generation polynomial of RS code is for generating a first codeword of N symbols including a parity code of 2T symbols, where the values of N and 2T are associated with the selected address mapper;
wherein the generation polynomial G(x) is:
G(x)=Π$_{k=0\sim(2T-1)}$(x+α$^k$), where α is an element of a finite field GF($2^8$) and is a root of a primitive polynomial P(x):

$$P(x)=x^8+x^4+x^3+x^2+1.$$

2. An encoding/decoding system according to claim 1, wherein:
when the encoding/decoding system is decoding, the shareable RS encoder/decoder receives a second codeword of N symbols including a parity code of 2T symbols and generates a plurality of syndromes, $S_k$, where k=0~15 and k is a positive integer, an error-erasure locator polynomial and an error-erasure evaluator polynomial for obtaining an error value to complete the error correction, wherein:
a syndrome $S_k$ is set to zero if k is greater than or equal to 2T and the syndromes are obtained from:

$$S_k = \sum_{i=0\sim N-1} (r_i \alpha^{ik}) \text{ for } k = 0 \sim 2T-1,$$

where $r_i$ for i=0~N−1 represents the N symbols of the codeword.

3. An encoding/decoding system according to claim 1, wherein the shareable Reel-Solomon (RS) encoder/decoder comprises:
an error correction code/syndrome (ECC/syndrome) generator, wherein the error correction code/syndrome (ECC/syndrome) generator is operative:
to employ the generation polynomial to generate the parity code and to output the first codeword when the encoding/decoding system is encoding, or
to output the syndromes $S_k$, where k=0~15 and k is a positive integer, when the encoding/decoding system is decoding;
an error-erasure locator/evaluator polynomial generator for generating the error-erasure locator polynomial and the error-erasure evaluator polynomial;
a Forney syndrome generator, coupled to the ECC/syndrome generator, for generating an erasure location polynomial and a Forney's modified syndrome polynomial, the Forney syndrome generator being for generating initialization values required by the error-erasure locator/evaluator polynomial generator;
a Chien search unit for obtaining a root of the error-erasure locator polynomial for finding an error location and an error value;
a first switch for selecting either the ECC/syndrome generator's output or the Chien search unit's output as the shareable RS encoder/decoder's output; and
a second switch for selecting either the ECC/syndrome generator's output or the Forney syndrome generator's output as the error-erasure locator/evaluator polynomial generator's input.

4. An encoding/decoding system according to claim 3, wherein the shareable RS encoder/decoder further comprises:
an inverter, coupled to an input terminal of the shareable RS encoder/decoder, for inverting input data and outputting the inverted input data; and
a third switch for selecting either coupling the input terminal of the shareable RS encoder/decoder to the ECC/syndrome generator or delivering the inverted input data to the ECC/syndrome generator.

5. An encoding/decoding system according to claim 3, wherein an interleaving process is performed when the C1 address mapper or the C2 address mapper accesses to the data buffer for encoding and a deinterleaving process is performed when the C1 address mapper or the C2 address mapper accesses to the data buffer for decoding.

6. An encoding/decoding system according to claim 3, wherein the encoding/decoding system further comprises a burst cutting area (BCA) ECC address mapper for accessing to the data buffer according to access sequence in the BCA ECC address mapper.

7. An encoding/decoding system according to claim 6, wherein:
the value of T is equal to two when the shareable RS encoder/decoder processes output from the C1 address mapper, the C2 address mapper, or the BCA ECC address mapper;
the value of T is equal to one when the shareable RS encoder/decoder processes output from the CD P/Q address mapper; or
the value of T is equal to eight for performing outer encoding/decoding or is equal to five for performing inner encoding/decoding respectively when the shareable RS encoder/decoder processes output from the DVD inner/outer address mapper.

8. An encoding/decoding system in an optical disk storage device, for performing compact disc/digital video disk (CD/DVD) encoding/decoding of data, the data stored in a data buffer, the encoding/decoding system comprising:
a C1 address mapper for accessing to the data buffer according to access sequence stored in the C1 address mapper;
a C2 address mapper for accessing to the data buffer according to access sequence stored in the C2 address mapper;
a CD P/Q address mapper for accessing to the data buffer according to access sequence stored in the CD P/Q address mapper;
a DVD inner/outer address mapper for accessing to the data buffer according to access sequence stored in the DVD inner/outer address mapper; and
a shareable Reel-Solomon (RS) encoder/decoder capable of selectively being coupled to either one of the C1 address mapper, the C2 address mapper, the CD P/Q address mapper, or the DVD inner/outer address mapper;
wherein when the encoding/decoding system is decoding, the shareable RS encoder/decoder receives a first codeword of N symbols including a parity code of 2T symbols, where the values of N and 2T are associated with the selected address mapper, and generates a plurality of syndromes $S_k$, where k=0~15 and k is a positive integer, an error-erasure locator polynomial and an error-erasure evaluator polynomial for obtaining an error value to complete the error correction, wherein:
a syndrome $S_k$ is set to zero if k is greater than or equal to 2T, the values of N and 2T are associated with the selected address mapper; and the syndromes $S_k$ are obtained from:

$$S_k = \sum_{i=0\sim N-1} (r_i \alpha^{ik}) \text{ for } k = 0 \sim 2T-1,$$

where $r_i$ for i=0~N-1 represents the N symbols of the codeword and

α is an element of a finite field $GF(2^8)$ and is a root of a primitive polynomial P(x):

$$P(x)=x^8+x^4+x^3+x^2+1.$$

9. An encoding/decoding system according to claim 8, wherein the shareable RS encoder/decoder employs an generation polynomial of RS code when the encoding/decoding system is encoding, the generation polynomial is for generating a second codeword of N symbols including a parity code of 2T symbols, wherein the generation polynomial G(x) is:

$$G(x)=\Pi_{k=0\sim(2T-1)}(x+\alpha^k).$$

10. An encoding/decoding system in an optical disk storage device, for performing compact disc/digital video disk (CD/DVD) encoding/decoding of data, the data stored in a data buffer, the encoding/decoding system comprising:
   a C1 address mapper for accessing to the data buffer according to access sequence stored in the C1 address mapper;
   a C2 address mapper for accessing to the data buffer according to access sequence stored in the C2 address mapper;
   a CD P/Q address mapper for accessing to the data buffer according to access sequence stored in the CD P/Q address mapper;
   a DVD inner/outer address mapper for accessing to the data buffer according to access sequence stored in the DVD inner/outer address mapper; and
   a shareable Reel-Solomon (RS) encoder/decoder capable of selectively being coupled to either one of the C1 address mapper, the C2 address mapper, the CD P/Q address mapper, or the DVD inner/outer address mapper, the shareable Reel-Solomon (RS) encoder/decoder comprising:
      an error correction code/syndrome (ECC/syndrome) generator, wherein the ECC/syndrome generator is operative:
         to employ the generation polynomial to generate a parity code and to output a first codeword when the encoding/decoding system is encoding, or
         to output a plurality of syndromes $S_k$, where k=0~15 and k is a positive integer, when the encoding/decoding system is decoding;
      an error-erasure locator/evaluator polynomial generator for generating an error-erasure locator polynomial and an error-erasure evaluator polynomial;
      a Forney syndrome generator, coupled to the ECC/syndrome generator, for generating an erasure location polynomial and a Forney's modified syndrome polynomial, the Forney syndrome generator being for generating initialization values required by the error-erasure locator/evaluator polynomial generator;
      a Chien search unit for obtaining a root of the error-erasure locator polynomial for finding an error location and an error value;
      a first switch, coupled between an output terminal of the shareable RS encoder/decoder and:

the ECC/syndrome generator when the encoding/decoding system is encoding, or
the Chien switch unit when the encoding/decoding system is decoding; and
a second switch, coupled between the error-erasure locator/evaluator polynomial generator and:
   the Forney syndrome generator when there is an erasure, or
   the CRC/syndrome generator otherwise;
wherein the generation polynomial G(x) is:

$$G(x)=\Pi_{k=0\sim(2T-1)}(x+\alpha^k), \text{ and}$$

the syndromes $S_k$ are obtained from:

$$S_k = \sum_{i=0\sim N-1} (r_i \alpha^{ik}) \text{ for } k = 0 \sim 2T-1,$$

where $r_i$ for i=0·N-1 represents the N symbols of the codeword, α is an element of a finite field $GF(2^8)$ and is a root of a primitive polynomial P(x):

$$P(x)=x^8+x^4+x^3+x^2+1.$$

11. An encoding/decoding system according to claim 10, wherein the shareable RS encoder/decoder further comprises:
   an inverter, coupled to an input terminal of the shareable RS encoder/decoder, for inverting input data and outputting the inverted input data; and
   a third switch for selecting either coupling the input terminal of the shareable RS encoder/decoder to the ECC/syndrome generator or delivering the inverted input data to the ECC/syndrome generator.

12. An encoding/decoding system according to claim 11, wherein an interleaving process is performed when the C1 address mapper or the C2 address mapper accesses to the data buffer for encoding and a deinterleaving process is performed when the C1 address mapper or the C2 address mapper accesses to the data buffer for decoding.

13. An encoding/decoding system according to claim 11, wherein the encoding/decoding system further comprises a burst cutting area (BCA) ECC address mapper for accessing to the data buffer according to access sequence in the BCA ECC address mapper.

14. An encoding/decoding system according to claim 11, wherein:
   the value of T is equal to two when the shareable RS encoder/decoder processes output from the C1 address mapper, the C2 address mapper, or the BCA ECC address mapper;
   the value of T is equal to one when the shareable RS encoder/decoder processes output from the CD P/Q address mapper; or
   the value of T is equal to eight for performing outer encoding/decoding or is equal to five for performing inner encoding/decoding respectively when the shareable RS encoder/decoder processes output from the DVD inner/outer address mapper.

15. A shareable Reel-Solomon (RS) encoder/decoder capable of selectively being coupled to either one of a C1 address mapper, a C2 address mapper, a CD P/Q address mapper, or a DVD inner/outer address mapper, the shareable RS encoder/decoder comprising:
   an error correction code/syndrome (ECC/syndrome) generator, wherein the ECC/syndrome generator is operative:

to employ a generation polynomial of RS code to generate a parity code of 2T symbols and to output a codeword of N symbols, where the values of 2T and N are associated with the selected address mapper, when the shareable RS encoder/decoder is encoding, or to generate a plurality of syndromes $S_k$, where k=0~15 and k is a positive integer and a syndrome $S_k$ is set to zero if k is greater than or equal to 2T, when the shareable RS encoder/decoder is decoding;

an error-erasure locator/evaluator polynomial generator for generating the error-erasure locator polynomial and the error-erasure evaluator polynomial;

a Forney syndrome generator, coupled to the ECC/syndrome generator, for generating an erasure location polynomial and a Forney's modified syndrome polynomial, the Forney syndrome generator being for generating initialization values required by the error-erasure locator/evaluator polynomial generator;

a Chien search unit for obtaining a root of the error-erasure locator polynomial for finding an error location and an error value;

a first switch, coupled between an output terminal of the shareable RS encoder/decoder and:
the ECC/syndrome generator when the shareable RS encoder/decoder is encoding, or
the Chien switch unit when the shareable RS encoder/decoder is decoding; and a second switch, coupled between the error-erasure locator/evaluator polynomial generator and:
the Forney syndrome generator when there is an erasure, or
the CRC/syndrome generator otherwise;

wherein the generation polynomial G(x) is:

$$G(x) = \Pi_{k=0 \sim (2T-1)}(x+\alpha^k), \text{ and}$$

the syndromes $S_k$ are obtained from:

$$S_k = \sum_{i=0 \sim N-1} (r_i \alpha^{ik}) \text{ for } k = 0 \sim 2T-1,$$

where $r_i$ for i=0~N−1 represents the N symbols of the codeword, $\alpha$ is an element of a finite field GF($2^8$) and is a root of a primitive polynomial P(x):

$$P(x) = x^8 + x^4 + x^3 + x^2 + 1.$$

16. A shareable RS encoder/decoder according to claim 15, further comprising:
an inverter, coupled to an input terminal of the shareable RS encoder/decoder, for inverting input data and outputting the inverted input data; and
a third switch for selecting either coupling the input terminal of the shareable RS encoder/decoder to the ECC/syndrome generator or delivering the inverted input data to the ECC/syndrome generator.

17. A shareable RS encoder/decoder according to claim 15, wherein the shareable RS encoder/decoder is capable of selectively being coupled to a burst cutting area (BCA) ECC address mapper further.

18. A shareable RS encoder/decoder according to claim 15, wherein:
the value of T is equal to two when the shareable RS encoder/decoder processes output from the C1 address mapper, the C2 address mapper, or the BCA ECC address mapper;
the value of T is equal to one when the shareable RS encoder/decoder processes output from the CD P/Q address mapper; or
the value of T is equal to eight for performing outer encoding/decoding or is equal to five for performing inner encoding/decoding respectively when the shareable RS encoder/decoder processes output from the DVD inner/outer address mapper.

19. An encoding/decoding system in an optical disk storage device, for performing compact disc/digital video disk (CD/DVD) encoding/decoding of data, the data stored in a data buffer, the encoding/decoding system comprising:
a CD address mapper for accessing to the data buffer according to access sequence stored in the CD address mapper;
a DVD inner/outer address mapper for accessing to the data buffer according to access sequence stored in the DVD inner/outer address mapper; and
a shareable Reel-Solomon (RS) encoder/decoder capable of selectively being coupled to either the CD address mapper or the DVD inner/outer address mapper;
wherein the shareable Reel-Solomon (RS) encoder/decoder employs a generation polynomial of RS code when the encoding/decoding system is encoding, the generation polynomial is for generating a first codeword of N symbols including a parity code of 2T symbols, where the values of N and 2T are associated with the selected address mapper; and
wherein the generation polynomial G(x) is:
$G(x) = \Pi_{k=0 \sim (2T-1)}(x+\alpha^k)$, where $\alpha$ is an element of a finite field GF($2^8$) and is a root of a primitive polynomial P(x):

$$P(x) = x^8 + x^4 + x^3 + x^2 + 1.$$

20. An encoding/decoding system according to claim 19, wherein the CD address mapper comprises:
a C1 address mapper for accessing to the data buffer according to access sequence stored in the C1 address mapper;
a C2 address mapper for accessing to the data buffer according to access sequence stored in the C2 address mapper; and
a CD P/Q address mapper for accessing to the data buffer according to access sequence stored in the CD P/Q address mapper.

* * * * *